United States Patent
Hayashi et al.

(10) Patent No.: US 9,669,608 B2
(45) Date of Patent: Jun. 6, 2017

(54) POROUS POLYTETRAFLUOROETHYLENE COMPOSITE AND METHOD FOR PRODUCING THE SAME

(71) Applicant: SUMITOMO ELECTRIC FINE POLYMER, INC., Sennan-gun, Osaka (JP)

(72) Inventors: Fumihiro Hayashi, Osaka (JP); Aya Murata, Osaka (JP); Atsushi Uno, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 14/758,637

(22) PCT Filed: Jun. 23, 2014

(86) PCT No.: PCT/JP2014/066554
§ 371 (c)(1),
(2) Date: Jun. 30, 2015

(87) PCT Pub. No.: WO2015/002000
PCT Pub. Date: Jan. 8, 2015

(65) Prior Publication Data
US 2015/0336364 A1    Nov. 26, 2015

(30) Foreign Application Priority Data

Jul. 1, 2013   (JP) .................. 2013-137985

(51) Int. Cl.
| | | |
|---|---|---|
| B32B 27/32 | (2006.01) | |
| B32B 37/12 | (2006.01) | |
| B32B 7/12 | (2006.01) | |
| B32B 27/08 | (2006.01) | |
| C08J 5/18 | (2006.01) | |
| B32B 3/26 | (2006.01) | |
| B01D 69/12 | (2006.01) | |
| B01D 71/36 | (2006.01) | |
| B01D 71/32 | (2006.01) | |

(52) U.S. Cl.
CPC ............ *B32B 27/322* (2013.01); *B01D 69/12* (2013.01); *B01D 71/32* (2013.01); *B01D 71/36* (2013.01); *B32B 3/26* (2013.01); *B32B 7/12* (2013.01); *B32B 27/08* (2013.01); *B32B 37/12* (2013.01); *C08J 5/18* (2013.01); *B32B 2250/04* (2013.01); *B32B 2250/24* (2013.01); *B32B 2305/026* (2013.01); *B32B 2307/306* (2013.01); *B32B 2307/54* (2013.01); *B32B 2307/702* (2013.01); *B32B 2309/02* (2013.01); *C08J 2327/18* (2013.01); *Y10T 428/249981* (2015.04)

(58) Field of Classification Search
CPC .. B32B 5/18; B32B 7/12; B32B 27/08; B32B 27/322; B32B 2250/24
See application file for complete search history.

(56) References Cited

U.S. PATENT DOCUMENTS

| 6,479,161 B1 * | 11/2002 | Araki ....................... B32B 1/08 428/500 |
| 2013/0092623 A1 | 4/2013 | Tsujiwaki et al. |
| 2013/0112621 A1 * | 5/2013 | Zheng ............... B01D 67/0088 210/650 |

FOREIGN PATENT DOCUMENTS

| CN | 1261379 A | 7/2000 |
| CN | 1507939 A | 6/2004 |
| CN | 1921905 A | 2/2007 |
| CN | 101104314 A | 1/2008 |
| CN | 102006925 A | 4/2011 |
| CN | 102933931 A | 2/2013 |
| CN | 102958587 A | 3/2013 |
| EP | 2 789 380 A1 | 10/2014 |
| JP | 4371176 B2 | 11/2009 |
| JP | 2010-094579 A | 4/2010 |
| JP | 2011-052175 A | 3/2011 |
| JP | 2012-037120 A | 2/2012 |
| JP | 2012-045524 A | 3/2012 |
| WO | WO-2008/018400 A1 | 2/2008 |
| WO | WO 2013/084858 A1 | 6/2013 |

OTHER PUBLICATIONS

Translation of JP 2011-052175; Hayashi et al; Mar. 17, 2011; p. 1-31.*
Fluororesin Handbook (Takaomi Satokawa issued by Nikkan Kogyo Shimbun, first edition: Nov. 30, 1990), along with its partial English-language translation.
Zhimian, Quian, et al., "Fluoroplastics Process Technology and Applications," Chemical Industry Press, 1st ed., Jul. 31, 2010.
Liu Guojie, et al., "Fluorocarbon Coatings and Construction Application of Fluorocarbon Coatings," China Petrochemical Press, P44, Jan. 2005.
Rae, P.J., et al., "The properties of poly(tetrafluoroethylene) (PTFE) in compression," Polymer, Elsevier Science Publishers B.V., GB, vol. 45, No. 22, Oct. 13, 2004, pp. 7615-7625.

\* cited by examiner

*Primary Examiner* — Hai Vo
(74) *Attorney, Agent, or Firm* — Drinker Biddle & Reath LLP

(57) ABSTRACT

A porous polytetrafluoroethylene composite includes a porous polytetrafluoroethylene film, a porous support layer that supports the porous polytetrafluoroethylene film, an adhesive layer bonded to the porous polytetrafluoroethylene film, and a porous reinforcement layer bonded to the adhesive layer, in which the adhesive layer is a layer composed of a fluororesin having a melting point, or a glass transition point when a melting point is not clearly defined, of lower than 260° C.

4 Claims, No Drawings

POROUS POLYTETRAFLUOROETHYLENE COMPOSITE AND METHOD FOR PRODUCING THE SAME

TECHNICAL FIELD

The present invention relates to a porous polytetrafluoroethylene (PTFE) composite and a method for producing the same. Herein, the term "porous PTFE composite" refers to a composite including a porous film (porous PTFE film) composed of a fluororesin containing PTFE as a main component, a support layer that supports the porous film, and a reinforcement layer that reinforces the porous film and the support layer.

BACKGROUND ART

PTFE is a resin having good heat resistance and good chemical resistance. A porous PTFE film having a uniform and fine pore diameter can be obtained by stretching a film which is prepared by molding fluororesin particles containing PTFE as a main component into a film and sintering the molded film. Since such a porous PTFE film is composed of a PTFE material, the porous PTFE film has good heat resistance and good chemical resistance. In addition, the porous PTFE film has a uniform and fine pore diameter and easily has a high porosity. Therefore, such a porous PTFE film is used as a filter for removing fine impurity particles from a liquid. For example, PTL 1 describes a combination (hereinafter referred to as "laminate") of such a porous PTFE film and a porous body functioning as a support layer that supports the porous PTFE film, and a method for producing the laminate. Such a laminate is suitably used in, for example, the field of semiconductor manufacturing as a filter for removing foreign substances from an etchant, a cleaning liquid, etc.

Recently, fine processing has advanced in the field of semiconductor manufacturing. With the progress of fine-processing technologies, the dimensions of foreign substances that are desired to be removed from an etchant, a cleaning liquid, etc. have also been decreasing. Accordingly, reduction in the filter pore diameter is desirable, but reduction in the filter pore diameter decreases the treatment flow rate. Reduction in the thickness of a porous PTFE film for the purpose of maintaining the treatment flow rate decreases the mechanical strength of the film.

In the case where the laminate of a porous PTFE film and a support layer that supports the porous PTFE film, the laminate being described in PTL 1, is used as a filter, in order to obtain a large filtration area, the laminate is often arranged in a filtering device as a filter having a pleated shape. However, there may be a problem in that, in folded portions of the pleats, leakage due to breakage of the porous PTFE film and expansion of the pore diameter of the porous PTFE film easily occur. Accordingly, development of technologies for reinforcing the laminate of a porous PTFE film and a support layer, the laminate being described in PTL 1, has been desired so that the laminate has good mechanical strength and can maintain heat resistance and chemical resistance, which are originally possessed by a PTFE film, while maintaining a fine pore diameter and a high treatment flow rate.

The reinforcement of a laminate of a porous PTFE film and a support layer that supports the porous PTFE film is achieved by a porous reinforcement layer. A widely used filter is a composite to which a mechanical strength is provided by laminating such a reinforcement layer on a porous PTFE film of a laminate including the porous PTFE film and a support layer. The reinforcement layer is a relatively thick film because the layer has a good mechanical strength, whereas the reinforcement layer is a porous film having a larger pore diameter than the porous PTFE film so as not to decrease the treatment flow rate of filtration.

Bonding between the reinforcement layer and the porous PTFE film is performed by, for example, a method in which the reinforcement layer and the porous PTFE film are simply laminated, and the resulting laminate is then fusion-bonded by heating to a melting point of PTFE or higher, or a method in which the reinforcement layer is bonded by using, as an adhesive, a tetrafluoroethylene-perfluoroalkyl vinyl ether copolymer (PFA), a tetrafluoroethylene-hexafluoropropylene copolymer (FEP), or the like. In the case where an adhesive is used, bonding is performed by providing a layer of a dispersion of PFA, FEP, or the like between the reinforcement layer and the porous PTFE film, and melting the PFA, FEP, or the like by heating. Accordingly, also in this case, heating to a temperature equal to or higher than a melting point of PFA, FEP, or the like is necessary for bonding.

CITATION LIST

Patent Literature

PTL 1: Japanese Patent No. 4371176

SUMMARY OF INVENTION

Technical Problem

For a porous PTFE composite functioning as a filter used in semiconductor manufacturing or the like in recent years, a mean flow pore diameter of about 30 nm or less is desired in some cases. However, in the method in which fusion bonding is merely used and the method in which bonding is performed by using PFA, FEP, or the like, heating at a high temperature is necessary and the pore diameter is expanded by the heating. Accordingly, a fine porous structure cannot be maintained, and a pore diameter of less than 40 nm is not obtained.

An object of the present invention is to provide a porous PTFE composite which has a fine pore diameter, maintains a high treatment flow rate and a good mechanical strength, and also maintains heat resistance and chemical resistance as good as those originally possessed by a PTFE film, and to provide a method for producing the composite. In particular, an object of the present invention is to provide a porous PTFE composite which has a pore diameter of less than 40 nm that meets the recent requirements, which achieves a high treatment flow rate, and in which, even in the case where the composite has a pleated shape, breakage of a porous PTFE film and expansion of the pore diameter do not occur in folded portions of the pleats, and to provide a method for producing the composite.

Solution to Problem (1) An embodiment of the present invention is a porous PTFE composite including a porous PTFE film, a porous support layer that supports the porous PTFE film, an adhesive layer bonded to the porous PTFE film, and a porous reinforcement layer bonded to the adhesive layer, in which the adhesive layer is a layer composed of a fluororesin having a melting point, or a glass transition point when a melting point is not clearly defined, of lower than 260° C.

(2) Another embodiment of the present invention is a method for producing a porous PTFE composite, the method including the steps of stretching a laminate of a nonporous fluororesin film containing PTFE as a main component and a porous layer functioning as a support layer that supports the fluororesin film to form a porous PTFE film from the nonporous fluororesin film, forming an adhesive layer on a surface of the porous PTFE film, and bonding a porous reinforcement layer to the adhesive layer, in which the adhesive layer is a layer composed of a fluororesin having a melting point, or a glass transition point when a melting point is not clearly defined, of lower than 260° C., and the step of bonding the reinforcement layer is conducted at a temperature equal to or higher than the melting point or the glass transition point and lower than 260° C.

Advantageous Effects of Invention

The porous PTFE composite of the present invention maintains heat resistance and chemical resistance as good as those originally possessed by a PTFE film, and has good mechanical strength. In particular, the porous PTFE composite of the present invention is a porous PTFE composite in which breakage of a porous PTFE film and expansion of a pore diameter do not occur, even in folded portions of pleats in the case where the composite has a pleated shape. According to the method for producing a porous PTFE composite of the present invention, it is possible to obtain a porous PTFE composite which maintains a fine pore diameter and a high treatment flow rate, and has good properties and good mechanical strength such that breakage of a porous PTFE film and expansion of a pore diameter do not occur in folded portions of pleats in the case where the composite has a pleated shape.

DESCRIPTION OF EMBODIMENTS

Next, embodiments for carting out the present invention will be specifically described. However, the present invention is not limited to these embodiments and Examples and can be changed to other embodiments as long as the object of the present invention is not impaired.

As a result of intensive studies, the inventors of the present invention found the following and completed the present invention. Bonding between a porous PTFE film and a porous body functioning as a reinforcement layer with an adhesive is performed by using an adhesive composed of a fluororesin having a melting point, or a glass transition point when a melting point is not clearly defined, of lower than 260° C. at a temperature equal to or higher than the melting point or the glass transition point and lower than 260° C. In this case, it is possible to obtain a porous PTFE composite which maintains a fine pore diameter and a high treatment flow rate, and has good mechanical strength such that breakage of a porous PTFE film and expansion of a pore diameter do not occur, even in folded portions of pleats in the case where the composite has a pleated shape. That is, the above object is achieved by configurations described below.

A first embodiment of the present invention is a porous PTFE composite including a porous PTFE film, a porous support layer that supports the porous PTFE film, an adhesive layer bonded to the porous PTFE film, and a porous reinforcement layer bonded to the adhesive layer, in which the adhesive layer is a layer composed of a fluororesin having a melting point, or a glass transition point when a melting point is not clearly defined, of lower than 260° C.

A laminate of a porous PTFE film and a support layer that supports the porous PTFE film is produced by, for example, the method described in PTL 1 (Japanese Patent No. 4371176). Specifically, the laminate is obtained by a method in which a porous layer functioning as a support layer is laminated on a nonporous PTFE film, which is prepared by molding fluororesin particles containing PTFE as a main component into a film and then sintering between the particles, and the resulting laminate including the nonporous PTFE film and the support layer and obtained by the lamination is stretched to make the nonporous PTFE film porous. The porous PTFE composite of the present invention is formed by bonding, with the adhesive layer, a reinforcement layer to the laminate of the porous PTFE film and the support layer, the laminate being obtained as described above.

The phrase "contains PTFE as a main component" means that PTFE is contained in an amount of 50% or more by mass but other resins may be contained as long as the object of the present invention is not impaired. In particular, a fluororesin containing 80% or more by mass of PTFE is preferable because good characteristics of PTFE, such as chemical resistance and heat resistance, become more significant.

The present invention is characterized in that an adhesive layer that bonds a porous PTFE film to a support layer is composed of a fluororesin having a melting point, or a glass transition point when a melting point is not clearly defined, of lower than 260° C. By using a fluororesin having a melting point, or a glass transition point when a melting point is not clearly defined, of lower than 260° C., a step of bonding the porous PTFE film to the reinforcement layer with the adhesive layer can be conducted at lower than 260° C. As a result, expansion of the pore diameter of the porous PTFE film due to heating in the bonding step can be prevented. In addition, it is possible to obtain a porous PTFE composite having good properties and good mechanical strength such that breakage of a porous PTFE film and expansion of a pore diameter do not occur, even in folded portions of pleats in the case where the composite has a pleated shape. The fluororesin constituting the adhesive layer is more preferably a fluororesin having a melting point, or a glass transition point when a melting point is not clearly defined, of lower than 200° C.

As the fluororesin constituting the adhesive layer and having a melting point, or a glass transition point when a melting point is not clearly defined, of lower than 260° C., a solvent-soluble, heat-resistant, and chemical-resistant fluorine ion exchange resin or amorphous fluororesin is suitably used. Examples of the fluorine ion exchange resin that can be used include coating materials and dispersions containing fluororesin particles dispersed therein, the coating materials and dispersions being commercially available under the trade name of Nafion (registered trademark, manufactured by E. I. du Pont de Nemours and Company), AQUIVION (registered trademark, manufactured by SOLVAY SPECIALTY POLYMERS JAPAN K.K.), etc. The term "amorphous fluororesin" refers to a non-crystalline fluororesin that is soluble in a solvent. Examples of the amorphous fluororesin that can be used include fluororesins that are commercially available under the trade name of Cytop (manufactured by Asahi Glass Co., Ltd.), Teflon (registered trademark) AF (manufactured by Du Pont-Mitsui Fluorochemicals Company, Ltd.), and Algoflon AD (manufactured by SOLVAY SPECIALTY POLYMERS JAPAN K.K.).

The porous PTFE film preferably has a mean flow pore diameter of less than 40 nm. The use of a porous PTFE film having such a fine pore diameter provides a filter having properties that meet the recent requirements in the field of semiconductor manufacturing. Although a mean flow pore diameter of less than 40 nm can be obtained by, for example, adjusting a stretching ratio, it has been hitherto difficult to obtain a mean flow pore diameter of less than 40 nm because the pore diameter is expanded by heating in a step of bonding a reinforcement layer. However, according to the present invention, expansion of the pore diameter in the step of bonding is prevented and a mean flow pore diameter of less than 40 nm can be obtained.

Since the porous PTFE composite of the present invention is desired to have good heat resistance and good chemical resistance, a porous body composed of PTFE is preferably used as the porous reinforcement layer included in the composite. An example of the porous body is a porous film produced by the method described in Japanese Examined Patent Application Publication No. 42-13560, the porous film being produced by stretching a film containing PTFE as a main component to make the film porous. More specifically, a porous body that is commercially available under the trade name of Poreflon HP-045-30 (stretched porous PTFE body manufactured by Sumitomo Electric Fine Polymer, Inc.), etc. can be used.

As described above, the reinforcement layer formed of a porous body is a relatively thick film because a good mechanical strength is desired, whereas the reinforcement layer is a porous film having a larger pore diameter than the porous PTFE film so as not to decrease the treatment flow rate of filtration. Usually, a porous body that has a thickness of about 5 to 200 μm and a mean flow pore diameter of about 0.1 to 5 μm and is composed of a fluororesin containing PTFE as a main component is suitably used.

A second embodiment of the present invention is a method for producing a porous PTFE composite, the method including the steps of stretching a laminate of a nonporous fluororesin film containing PTFE as a main component and a porous layer functioning as a support layer that supports the fluororesin film to form a porous PTFE film from the nonporous fluororesin film, forming an adhesive layer on a surface of the porous PTFE film, and bonding a porous reinforcement layer to the adhesive layer, in which the adhesive layer is a layer composed of a fluororesin having a melting point, or a glass transition point when a melting point is not clearly defined, of lower than 260° C., and the step of bonding the reinforcement layer is conducted at a temperature equal to or higher than the melting point or the glass transition point and lower than 260° C.

The nonporous fluororesin film containing PTFE as a main component is preferably a nonporous film (film having a large Gurley second) that contains FIFE as a main component and that does not have defects such as a large pore. A porous PTFE film is obtained by stretching this film. The degree of stretching is preferably determined within a range where the mean flow pore diameter becomes less than 40 nm.

The support layer is formed of a porous body having a larger pore diameter than the fluororesin porous film, and is desired to have a good mechanical strength, and the like. Accordingly, a fluororesin porous body is preferably used as the support layer. The nonporous fluororesin film is laminated on the support layer, and the porous support layer is also stretched by the stretching.

The layer of an adhesive is formed on the porous PTFE film side (that is, a surface opposite to the support layer) of the laminate of the porous PTFE film (porous film composed of a fluororesin containing PTFE as a main component) formed by stretching and a support layer, and the porous reinforcement layer is laminated on the layer of the adhesive. After the lamination, the porous PTFE film and the porous reinforcement layer are bonded to each other by heating. This heating is conducted at a temperature equal to or higher than a melting point or a glass transition point of the fluororesin constituting the adhesive and lower than 260° C. When this heating temperature is lower than a melting point, or a glass transition point when a melting point is not clearly defined, of the fluororesin constituting the adhesive, sufficient bonding is not obtained. On the other hand, when the heating temperature is 260° C. or more, the pore diameter is expanded and thus it becomes difficult to obtain a pore diameter of less than 40 nm.

In the production method of the present invention, more preferably, a fluororesin having a melting point, or a glass transition point when a melting point is not clearly defined, of lower than 260° C. is used as the fluororesin constituting the adhesive layer, and the heating in the bonding step is conducted at a temperature equal to or higher than the melting point or the glass transition point of the fluororesin and lower than 260° C. In this case, expansion of the pore diameter of the porous PTFE film in the bonding step can be more effectively prevented.

EXAMPLES

First, methods of measurement performed in Examples and Comparative Examples below will be described.

[Method for Measuring Porosity]

A sample having a diameter φ of 47 mm was prepared by punching, and the weight of the sample was measured. A porosity was calculated from the weight, the volume (area× thickness) of the sample, and the true specific gravity of a fluororesin (PTFE) of 2.25 g/cm$^3$.

[Method for Measuring Mean Flow Pore Diameter]

A mean flow pore diameter was measured with a pore distribution measuring instrument (Perm Porometer CFP-1500A: manufactured by Porous Materials, Inc.) using, as a liquid, GALWICK (propylene, 1,1,2,3,3,3-oxidized hexahydrofluoric acid (manufactured by Porous Materials, Inc.)). Specifically, the mean flow pore diameter is determined as follows. First, a relationship between a differential pressure applied to a film and a flow rate of air permeating through the film is measured in the case where the film is dry and the case where the film is wet with a liquid. The obtained two graphs are referred to as a dry curve and a wet curve, respectively. A differential pressure at an intersection of the wet curve and a curve drawn by halving the flow rate in the dry curve is denoted by P (Pa). The mean flow pore diameter is determined by the following formula:

$$\text{Mean flow pore diameter } d \text{ (μm)} = c\gamma/P$$

where c represents a constant of 2,860 and γ represents a surface tension (dynes/cm) of the liquid.

[Method for Measuring IPA Flow Rate]

A flow rate per unit area (1 cm$^2$) when isopropyl alcohol (IPA) was permeated at a differential pressure of 0.1 MPa was measured.

[Production of Laminate of Porous PTFE Film and Support Layer]

A PTFE dispersion AD911 (manufactured by Asahi Glass Co., Ltd.), an MFA latex (manufactured by SOLVAY SPECIALTY POLYMERS JAPAN K.K.), and a PFA dispersion 920HP (solid content: 60% by mass; manufactured by Du Pont-Mitsui Fluorochemicals Company, Ltd.) were used. A fluororesin dispersion having 2% of MFA/(PTFE+MFA+PFA)(volume ratio of fluororesin solid content) and 2% of PFA/(PTFE+MFA+PFA)(volume ratio of fluororesin solid content) was prepared. Polyethylene oxide having a molecular weight of 2,000,000 was further added so as to have a concentration of 3 mg/mL to prepare a fluororesin dispersion.

[Preparation of Specimen]

An aluminum foil having a thickness of 50 μm was spread and fixed on a flat glass plate so as not to form wrinkles. The fluororesin dispersion prepared as described above was dripped onto the aluminum foil. Subsequently, the fluororesin dispersion was spread over the surface of the aluminum foil so as to be uniform by rolling a stainless steel slide shaft (trade name: Stainless Fine Shaft SNSF type, outer diameter: 20 mm) manufactured by Nippon Bearing Co., Ltd.

The foil was dried at 80° C. for one hour, heated at 250° C. for one hour, and then heated at 340° C. for one hour. After these steps were performed in that order, the foil was naturally cooled. Thus, a fluororesin film (nonporous fluororesin film containing PTFE as a main component) fixed to the aluminum foil was formed. An average thickness of the fluororesin film was calculated from a difference in weight per unit area of the aluminum foil between before and after the formation of the fluororesin film, and the true specific gravity (2.25 g/cm$^3$) of the fluororesin. The average thickness of the fluororesin film was about 3 μm.

Next, a PFA dispersion was prepared by diluting a PFA dispersion 920 HP with distilled water by 4-fold in terms of volume. Polyethylene oxide having a molecular weight of 2,000,000 was added to the PFA dispersion so as to have a concentration of 3 mg/mL. Thus, a 4-fold diluted PFA dispersion was prepared.

The fluororesin film fixed on the aluminum foil was spread and fixed on a flat glass plate so as not to form wrinkles. The 4-fold diluted PFA dispersion prepared as described above was dripped onto the fluororesin film. Subsequently, the 4-fold diluted PFA dispersion was spread over the surface of the aluminum foil so as to be uniform by rolling a stainless steel slide shaft manufactured by Nippon Bearing Co., Ltd., the slide shaft being the same as the slide shaft described above. In addition, before the moisture was removed, a stretched porous PTFE body (manufactured by Sumitomo Electric Fine Polymer, Inc.; trade name: Poreflon FP-045-80) (IPA-BP: 150 kPa, porosity: 70%, Gurley seconds: 9.1 seconds) having a pore diameter of 0.45 μm and a thickness of 80 μm was placed thereon.

Subsequently, a step of drying at 80° C. for one hour, a step of heating at 250° C. for one hour, a step of heating at 320° C. for one hour, and a step of heating at 317.5° C. for eight hours were conducted in that order. Natural cooling was then conducted, thus preparing a composite in which the nonporous fluororesin film composed of a mixture of PTFE, MFA, and PFA and containing the PTFE as a main component was bonded on the stretched porous PTFE body with the thermoplastic PFA therebetween, the thermoplastic PFA having a lower melting point than PTFE, and the aluminum foil was further fixed on the nonporous fluororesin film. The aluminum foil was then removed by dissolving in hydrochloric acid to prepare a specimen (laminate of a nonporous PTFE film).

Next, this specimen was stretched in a width direction using a tensile testing machine at a temperature of 15° C., a distance between chucks of 55 mm, and a stroke of 165 mm (stretching ratio: 200%). Subsequently, the specimen was further stretched in a direction perpendicular to the width direction using the same tensile testing machine at a temperature of 60° C., a distance between chucks of 55 mm, and a stroke of 88 mm (stretching ratio: 60%). This specimen (laminate of a support layer and a porous PTFE film) after stretching is referred to as "NM1". NM1 had a mean flow pore diameter of 32.7 nm, and it was found that the fluororesin film that was made porous by stretching had very fine continuous pores. The IPA flow rate was 1.19 mL/min·cm$^3$.

The production of the stretched specimen (laminate of a support layer and a porous PTFE film) was further conducted twice under the same conditions as described above. The prepared specimens after stretching were referred to as "NM2" and "NM3". The mean flow pore diameters of NM2 and NM3 were 30.7 nm and 32.9 nm, respectively. The IPA flow rates of NM2 and NM3 were 0.97 mL/min·cm$^3$ and 1.05 mL/min·cm$^3$, respectively.

Example 1

AQUIVION DISPERSION AC D83-24B (manufactured by SOLVAY SPECIALTY POLYMERS JAPAN K.K., fluorine ion exchange resin: solid content 24% by mass, glass transition temperature: about 220° C.) was diluted by 20 fold. The resulting liquid was uniformly applied onto the porous PTFE film side of NM2 prepared as described above with a brush such that the volume of the liquid became 12 mL relative to 1 m$^2$ of the film. Poreflon HP-045-30 (stretched porous PTFE body manufactured by Sumitomo Electric Fine Polymer, Inc., mean flow pore diameter: 152.0 nm, IPA flow rate: 13.88 mL/min·cm$^3$) was laminated on the applied layer, and heated at 220° C. for 120 minutes to bond the Poreflon HP-045-30 (reinforcement layer) to NM2. The mean flow pore diameter after bonding was 33.6 nm (109.4% relative to 30.7 nm before bonding). The IPA flow rate after bonding was 0.88 mL/min·cm$^3$ (90.7% relative to 0.97 mL/min·cm$^3$ before bonding).

Comparative Example 1

Bonding between NM2 and Poreflon HP-045-30 (reinforcement layer) was conducted as in Example 1 except that the temperature of the bonding was 120° C. However, sufficient bonding was not obtained.

Example 2

Algoflon AD-60 (amorphous fluororesin, manufactured by SOLVAY SPECIALTY POLYMERS JAPAN K.K., glass transition temperature: 125° C.) was added to 35 mL of IPA and 86 mL of water. The resulting mixture was mixed using a homogenizer to prepare an adhesive liquid having a solid content concentration of 1% by mass. This adhesive liquid was uniformly applied onto the porous PTFE film side of NM3 prepared as described above with a brush such that the volume of the adhesive liquid became 12 mL relative to 1 m$^2$ of the film. Poreflon HP-045-30 (stretched porous PTFE body manufactured by Sumitomo Electric Fine Polymer, Inc., mean flow pore diameter: 152.0 nm, IPA flow rate: 13.88 mL/min·cm$^3$) was laminated on the applied layer, and heated at 150° C. for 120 minutes to bond the Poreflon HP-045-30 (reinforcement layer) to NM3. The mean flow pore diameter after bonding was 32.0 nm (97.3% relative to 32.9 nm before bonding). The IPA flow rate after bonding was 0.94 mL/min·cm$^3$ (89.5% relative to 1.05 mL/min·cm$^3$ before bonding).

Comparative Example 2

An FEP (melting point: 260° C.) was uniformly applied onto the porous PTFE film side of NM1 prepared as described above with a brush. Poreflon HP-045-30 (stretched porous PTFE body manufactured by Sumitomo Electric Fine Polymer, Inc., mean flow pore diameter: 152.0 nm, IPA flow rate: 13.88 mL/min·cm$^3$) was laminated on the applied layer, and heated at 250° C. for 120 minutes to bond the Poreflon HP-045-30 (reinforcement layer) to NM1. However, sufficient bonding was not obtained.

Comparative Example 3

Bonding between NM1 and Poreflon HP-045-30 (reinforcement layer) was conducted as in Comparative Example 2 except that the temperature of the bonding was 270° C. The mean flow pore diameter after bonding was 43.4 nm (132.7% relative to 32.7 nm before bonding). The IPA flow rate after bonding was 1.28 mL/min·cm$^3$ (107.6% relative to 1.19 mL/min·cm$^3$ before bonding).

AQUIVION DISPERSION AC D83-24B (fluorine ion exchange resin) having a glass transition temperature of about 220° C. or Algoflon AD-60 (amorphous fluororesin) having a glass transition temperature of 125° C. was used as the adhesive. In Examples 1 and 2, in which the bonding was conducted at a temperature of lower than 260° C. (220° C. and 150° C., respectively), expansion of the pore diameter in the step of bonding did not occur or occurred slightly, and composites having a pore diameter of less than 40 nm were obtained. In contrast, in Comparative Example 3, in which the FEP having a melting point of 260° C. was used as the adhesive and the bonding was conducted at 270° C., the pore diameter was expanded in the step of bonding and a composite having a pore diameter of less than 40 nm was not obtained. These results show that, by conducting the step of bonding at a temperature of lower than 260° C., expansion of the pore diameter in the step of bonding is suppressed and a composite having a pore diameter of less than 40 nm is obtained.

In Comparative Examples 1 and 2, in which the bonding was conducted at a temperature lower than the melting point or the glass transition temperature of the adhesive (at 120° C. relative to the glass transition temperature of 220° C. in Comparative Example 1 and at 250° C. relative to the melting point of 260° C. in Comparative Example 2), sufficient bonding was not obtained. These results show that the temperature in the step of bonding needs to be equal to or higher than the melting point or the glass transition temperature of the adhesive.

Example 3

The composite obtained in Example 1 and including NM2 and Poreflon HP-045-30 (reinforcement layer) was folded in half along a center line thereof, and a stainless steel roller having a diameter of 50 mm was rolled on the fold. The composite was then expanded, and the mean flow pore diameter and the IPA flow rate were measured. The mean flow pore diameter and the IPA flow rate were substantially the same as those before folding in half. These results suggest that, even in the case where the porous PTFE composite of the present invention has a pleated shape, breakage of the film and expansion of the pore diameter in folded portions of the pleats do not easily occur.

The invention claimed is:

1. A porous polytetrafluoroethylene composite comprising:
    a porous polytetrafluoroethylene film with a mean flow pore diameter of less than 40 nm;
    a porous support layer that supports the porous polytetrafluoroethylene film;
    a first adhesive layer disposed between the porous support layer and the porous polytetrafluoroethylene film;
    a second adhesive layer bonded to the porous polytetrafluoroethylene film; and
    a porous reinforcement layer bonded to the second adhesive layer, the second adhesive layer being disposed between the porous reinforcement layer and the polytetrafluoroethylene film;
    wherein the second adhesive layer is a layer composed of a fluororesin having a melting point of lower than 220° C., or a glass transition point when a melting point is not clearly defined, of lower than 220° C., and
    wherein the first adhesive layer and the second adhesive layer are made of different compositions.

2. The porous polytetrafluoroethylene composite according to claim 1, wherein the fluororesin having a melting point, or a glass transition point when a melting point is not clearly defined, of lower than 220° C. is a fluorine ion exchange resin or an amorphous fluororesin.

3. The porous polytetrafluoroethylene composite according to claim 1, wherein the porous reinforcement layer is a polytetrafluoroethylene porous body.

4. A method for producing a porous polytetrafluoroethylene composite, comprising:
    stretching a laminate of a nonporous fluororesin film containing polytetrafluoroethylene as a main component and a porous layer functioning as a support layer that supports the fluororesin film to form a porous polytetrafluoroethylene film from the nonporous fluororesin film, wherein a first adhesive layer is disposed between the nonporous fluororesin film and the support layer, and wherein the porous polytetrafluoroethylene film has a mean flow pore diameter of less than 40 nm;
    forming a second adhesive layer on a surface of the porous polytetrafluoroethylene film; and
    bonding a porous reinforcement layer to the second adhesive layer, wherein the second adhesive layer is a layer composed of a fluororesin having a melting point of lower than 220 20 C., or a glass transition point when a melting point is not clearly defined, of lower than 220° C., and the bonding of the reinforcement layer is conducted at a temperature equal to or higher than the melting point of lower than 220° C. or the glass transition point of lower than 220° C., and wherein the first adhesive layer and the second adhesive layer are made of different compositions.

* * * * *